United States Patent
Cha et al.

(10) Patent No.: US 12,545,641 B2
(45) Date of Patent: Feb. 10, 2026

(54) AMPHOTERIC FLUORESCENT SUBSTANCE CAPABLE OF BEING ATTACHED TO BIOMATERIALS

(71) Applicant: C-BIOMEX Co., Ltd., Pohang-si (KR)

(72) Inventors: Jun-Hoe Cha, Seoul (KR); Hak-Soo Choi, Iksan-si (KR)

(73) Assignee: C-BIOMEX CO., LTD., Pohang-si (KR)

(*) Notice: Subject to any disclaimer, the term of this patent is extended or adjusted under 35 U.S.C. 154(b) by 808 days.

(21) Appl. No.: 17/798,841

(22) PCT Filed: Feb. 10, 2020

(86) PCT No.: PCT/KR2020/001852
§ 371 (c)(1),
(2) Date: Aug. 10, 2022

(87) PCT Pub. No.: WO2021/162133
PCT Pub. Date: Aug. 19, 2021

(65) Prior Publication Data
US 2023/0098702 A1    Mar. 30, 2023

(51) Int. Cl.
*C07D 209/04* (2006.01)
*C09K 11/56* (2006.01)

(52) U.S. Cl.
CPC ............ *C07D 209/04* (2013.01); *C09K 11/56* (2013.01)

(58) Field of Classification Search
CPC ............................. C09K 11/56; C07D 209/04
See application file for complete search history.

(56) References Cited

U.S. PATENT DOCUMENTS

| | | | |
|---|---|---|---|
| 6,995,274 B2 * | 2/2006 | Lugade | G01N 33/582 548/455 |
| 7,750,163 B2 | 7/2010 | West et al. | |
| 8,148,539 B2 | 4/2012 | West et al. | |
| 8,481,752 B2 | 7/2013 | Xu et al. | |
| 8,889,887 B2 | 11/2014 | Peng et al. | |
| 9,023,611 B2 | 5/2015 | Frangioni et al. | |
| 9,089,603 B2 * | 7/2015 | Xu | C09B 23/0008 |
| 9,687,567 B2 | 6/2017 | Frangioni et al. | |
| 10,201,621 B2 | 2/2019 | Frangioni et al. | |
| 10,478,512 B2 | 11/2019 | Frangioni et al. | |
| 10,961,193 B2 | 3/2021 | Schnermann et al. | |
| 11,746,086 B2 | 9/2023 | Schnermann et al. | |
| 11,787,764 B2 | 10/2023 | Schnermann et al. | |
| 2004/0260072 A1 | 12/2004 | Licha et al. | |
| 2007/0203343 A1 | 8/2007 | West et al. | |
| 2010/0267937 A1 | 10/2010 | West et al. | |
| 2010/0323389 A1 | 12/2010 | Xu et al. | |
| 2012/0028291 A1 | 2/2012 | Frangioni et al. | |
| 2013/0309715 A1 | 11/2013 | Peng et al. | |
| 2015/0029451 A1 | 1/2015 | Ogawa et al. | |
| 2015/0073154 A1 | 3/2015 | Davis | |
| 2016/0222212 A1 | 8/2016 | Davis | |
| 2017/0290927 A1 | 10/2017 | Frangioni et al. | |
| 2018/0177896 A1 | 6/2018 | Frangioni et al. | |
| 2021/0017132 A1 | 1/2021 | Schnermann et al. | |
| 2021/0100919 A1 | 4/2021 | Schnermann et al. | |
| 2021/0198196 A1 | 7/2021 | Schnermann et al. | |
| 2023/0098702 A1 | 3/2023 | Cha et al. | |
| 2023/0382857 A1 | 11/2023 | Schnermann et al. | |

FOREIGN PATENT DOCUMENTS

| | | |
|---|---|---|
| EP | 4105295 A1 | 12/2022 |
| JP | 2006-513293 A | 4/2006 |
| JP | 2012-524153 A | 10/2012 |
| WO | 2004/065491 A1 | 8/2004 |
| WO | 2005/044923 A1 | 5/2005 |
| WO | 2010/121163 A2 | 10/2010 |
| WO | 2010/121163 A3 | 10/2010 |
| WO | 2019/161159 A1 | 8/2019 |
| WO | 2021/162133 A1 | 8/2021 |

OTHER PUBLICATIONS

Notice of Allowance dated Oct. 11, 2024 for corresponding Japanese Patent Application No. 2022-548531, along with an English translation (5 pages).
Do Won Hwang et al., "Chemical Modulation of Bioengineered Exosomes for Tissue-Specific Biodistribution", Advanced Therapeutics, vol. 2, 2019, (8 pages).
Japanese Office Action dated Sep. 29, 2023 for corresponding Japanese Patent Application No. 2022-548531, 6 pages, English Machine Translation.
Australian Office Action dated Jul. 27, 2023 for corresponding Australian Patent Application No. 2020428814, 10 pages.
Canadian Office Action dated Oct. 3, 2023 for corresponding Canadian Patent Application No. 3,167,456, 3 pages.
Hwang et al., "Chemical Modulation of Bioengineered Exosomes for Tissue-Specific Biodistribution", Advanced Therapeutics, Nov. 2019, vol. 2, No. 11, 18 pages.
The Extended European Search Report dated Nov. 29, 2023 for corresponding European Patent Application No. 20918707.9 (8 pages).
Costyl N. Njiojob et al., "Tailored Near-Infrared Contrast Agents for Image Guided Surgery", Journal of Medicinal Chemistry, Feb. 2015, vol. 58, No. 6, pp. 2845-2854.
Steffen van der Wal et al., "Synthesis and systematic evaluation of symmetric sulfonated centrally C—C bonded cyanine near-infrared dyes for protein labelling", Dyes and Pigments, Apr. 20, 2016, vol. 132, pp. 7-19.
Atif Zaheer et al., "IRDye78 Conjugates for Near-Infrared Fluorescence Imaging", Molecular Imaging, Oct. 2002, vol. 1, No. 4, pp. 354-364.

(Continued)

*Primary Examiner* — Kamal A Saeed

(74) *Attorney, Agent, or Firm* — Hauptman Ham, LLP

(57) ABSTRACT

The present invention provides an amphoteric fluorescent substance capable of being attached to biomaterials.

4 Claims, 1 Drawing Sheet

(56) References Cited

OTHER PUBLICATIONS

Rupesh Nanjunda et al., "Halogenated pentamethine cyanine dyes exhibiting high fidelity for G-quadruplex DNA", Bioorganic & Medicinal Chemistry, Oct. 16, 2012, vol. 20, No. 24, pp. 7002-7011.
International Search Report mailed on Nov. 4, 2020, in connection with International Patent Application No. PCT/KR2020/001852, along with an English translation.
Written Opinion mailed on Nov. 4, 2020, in connection with International Patent Application No. PCT/KR2020/001852.
Nanjunda et al., "Halogenated pentamethine cyanine dyes exhibiting high fidelity for G-quadruplex DNA," Bioorganic & Medicinal Chemistry, Oct. 16, 2012, vol. 20, pp. 7002-7011.

\* cited by examiner

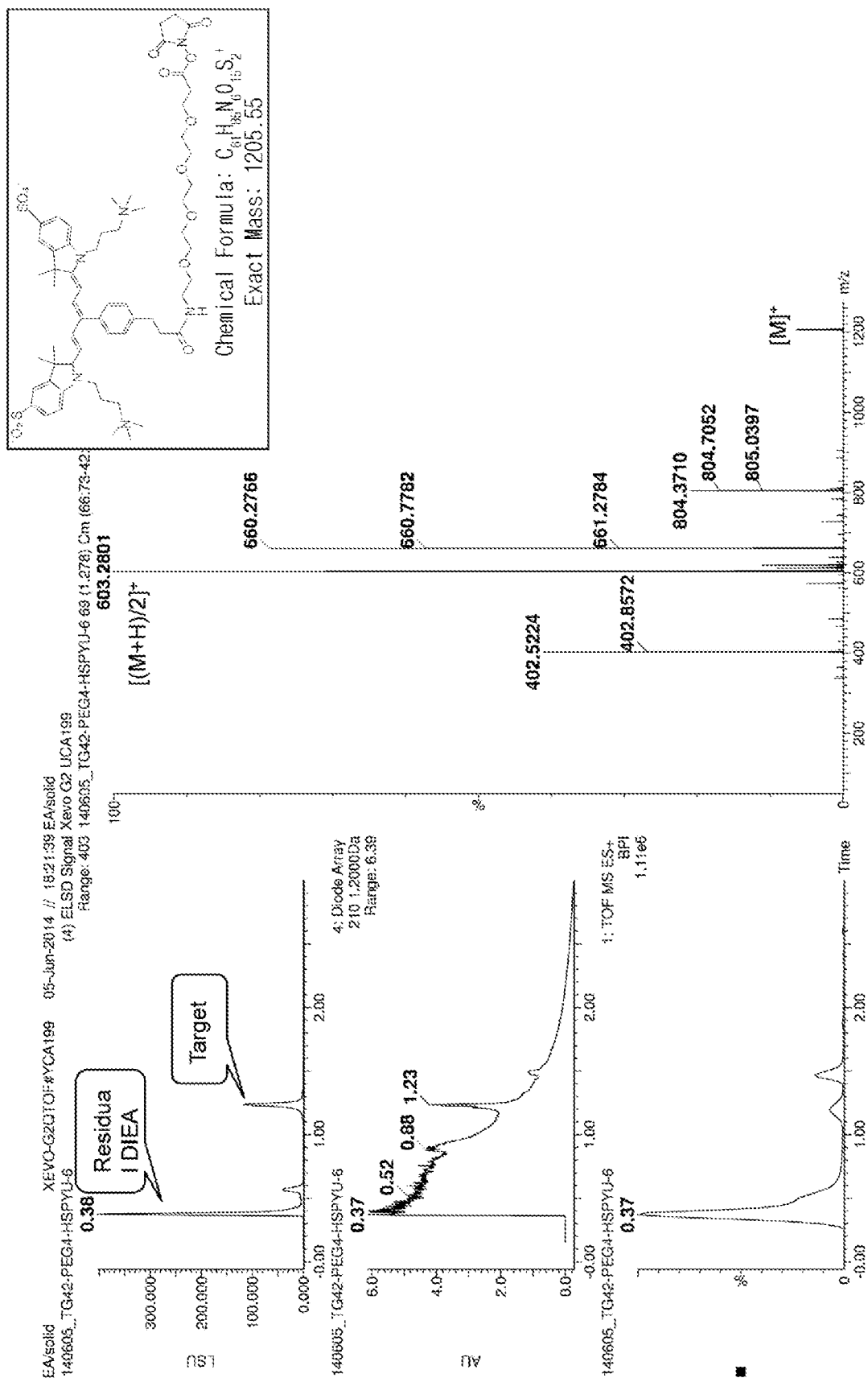

AMPHOTERIC FLUORESCENT SUBSTANCE CAPABLE OF BEING ATTACHED TO BIOMATERIALS

CROSS-REFERENCE TO RELATED APPLICATIONS

The present application is a national stage filing under 35 U.S.C § 371 of PCT application number PCT/KR2020/001852 filed on Feb. 10, 2020, in the Korean Intellectual Property Office, which is incorporated herein by reference in its entirety.

TECHNICAL FIELD

The present disclosure relates to an amphoteric fluorescent substance that is capable of binding to a biomaterial.

DESCRIPTION OF RELATED ART

A fluorescent dye has been widely used in biological research, and recently, is being used not only in clinical diagnosis (immunochemistry, molecular diagnosis, etc.) but also in special surgery such as cancer treatment.

The fluorescent dye has been used for omics-related microarray technology and cell analysis research. Recently, the fluorescent dye has also been used in molecular biology studies such as western blot and real-time PCR, etc.

The fluorescent dye is widely used in traditional immunochemical diagnostics, recently developed POCT (point of care testing), and molecular diagnostics (biosensors, etc.).

In addition, under recent development of targeted therapeutics and companion diagnostic technology, a technology that can identify degree of metastasis of cancer cells at the same time as the cancer surgery using the fluorescent dyes is being developed.

Most of the fluorescent dyes developed and commercialized conventionally are electrically charged to induce non-specific binding with electrically-charged biomolecules such as proteins, nucleic acids, and lipids.

DISCLOSURE

Technical Purpose

A perfectly neutral fluorescent dye exhibits a false positive reaction due to non-specific binding with a protein containing a large number of amino acids with high aromaticity due to strong aromaticity and hydrophobicity, or large biomolecules with high hydrophobicity. Such a false-positive reaction causes decrease in reliability in use of protein-specific peptide technology in immunochemical diagnosis and biochip.

On the other hand, a small biomolecule such as a peptide and an aptamer has a small molecular weight. Thus, when the small biomolecule binds to a conventional fluorescent dye, the binding is subject to the charge characteristics of the fluorescent dye.

In order to minimize non-specific binding between the fluorescent dye and the biomolecule, a method using a buffer solution or a neutral surfactant may be considered. However, as, recently, the fluorescent dye is used in a biosensor and a surgical operation, precision of analysis is required.

The present disclosure is set forth to solve the problems of the prior art. The inventors of the present application have developed a fluorescent dye as an amphoteric material having amphoteric ability as a basic characteristic of the amino acid and the protein, such that the non-specific reactivity of the fluorescent dye to the biomolecule can be minimized. In this way, the present disclosure has been completed.

A purpose of the present disclosure is to provide a novel fluorescent dye that can improve accuracy of protein detection and analysis.

The purposes of the present disclosure are not limited to the technical purposes as mentioned above, and other technical purposes as not mentioned will be clearly understood by those skilled in the art from following description.

Technical Solution

An amphoteric fluorescent substance that is capable of binding to a biomaterial according to the present disclosure includes at least one of compounds represented by a following Structural Formula 1:

<Structural Formula 1>

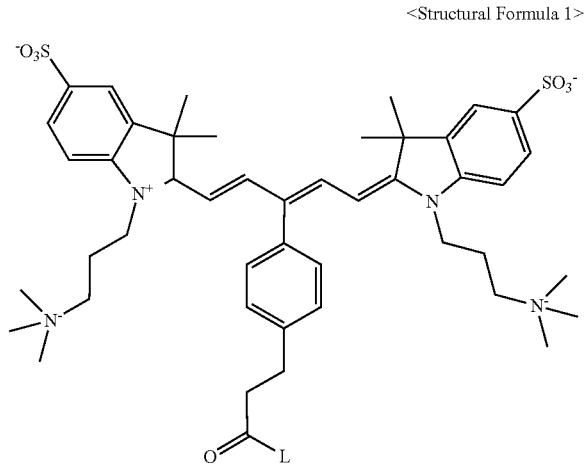

In the Structural Formula 1, L is $-(L1)_n-(L2)$.

In the Structural Formula 1, L1 is $-NH-CH_2-(CH_2-O-CH_2)_m-CH_2-C(=O)-$.

In the Structural Formula 1, L2 is one of azide, acetylene, maleimide, biotin, hydrizide,

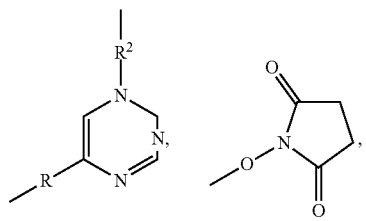

$-R_3-(C(=O))_2-NH-NH_2$, and $-R_4-(S(=O))_2-NH-NH_2$. Each of $R_1$, $R_2$, $R_3$, and $R_4$ is C1-6 divalent aliphatic hydrocarbon, C1-6 alkylene or divalent aromatic hydrocarbon, or a derivative thereof.

In the Structural Formula 1, n is 0 or 1.

In the Structural Formula 1, m is an integer of 0 to 4.

Details of other embodiments are included in the detailed descriptions and the drawings.

TECHNICAL EFFECT

The present disclosure has at least a following effect:

The amphoteric fluorescent substance according to the present disclosure can minimize the non-specific reaction to the biomaterial to improve accuracy of protein detection and analysis.

Effects of the present disclosure are not limited to the above-mentioned effects, and other effects as not mentioned will be clearly understood by those skilled in the art from following descriptions.

BRIEF DESCRIPTION OF DRAWINGS

FIG. 1 is a UPLC (Ultra-Performance Liquid Chromatography) analysis result of an amphoteric fluorescent substance according to an embodiment of the present disclosure.

DETAILED DESCRIPTIONS

Advantages and features of the present disclosure, and a method of achieving the advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

In addition, in describing the present disclosure, when it is determined that a detailed description of a known process or step related to the present disclosure may unnecessarily obscure gist of the present disclosure, the detailed description is omitted.

It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof.

In addition, as used herein, "A to B" means A inclusive to B inclusive, "A inclusive to B exclusive" means A inclusive to B exclusive, and "A exclusive to B inclusive" means A exclusive to B inclusive. As used herein, "Ca to b" means that the number of carbon atoms is in a range of a to b.

Since the amphoteric fluorescent substance according to the present disclosure contains an amphoteric ion moiety in which cations and anions coexist, non-specific reaction thereof to the biomaterial such as amino acids, peptides or proteins can be minimized.

The amphoteric fluorescent substance (hereinafter, referred to as 'amphoteric fluorescent substance according to the present disclosure') that is capable of binding to the biomaterial according to the present disclosure includes at least one of compounds represented by a following Structural Formula 1.

<Structural Formula 1>

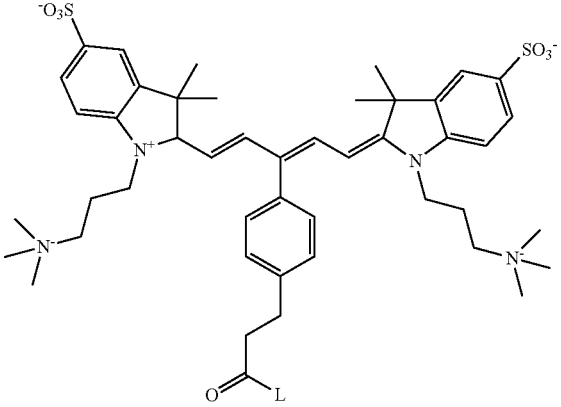

The compound represented by the above Structural Formula 1 is a compound in which -Ph-$CH_2$—$CH_2$—C($=$O)-L as a linker capable of connecting a pair of amphoteric ion moieties and a biomaterial such as an amino acid, a peptide or a protein to each other is introduced to a pentamethine cyanine dye. Ph is

As identified by the inventors, a control in which —O-Ph-$CH_2$—$CH_2$—C($=$O)-L was introduced as a linker had an unstable structure in a buffer aqueous solution. When the control was labeled on the biomaterial such as a protein, fluorescence intensity in screening weakened over time. On the contrary, the amphoteric fluorescent substance according to the present disclosure in which -Ph-$CH_2$—$CH_2$—C($=$O)-L was introduced as a linker had higher structural stability in the buffer aqueous solution than that of the control.

In the Structural Formula 1, L is -(L1)$_n$-(L2). In the Structural Formula 1, L1 is —NH—$CH_2$—($CH_2$—O—$CH_2$)$_m$—$CH_2$—C($=$O)—. In the Structural Formula 1, L2 is one of azide, acetylene, maleimide, biotin, hydrizide,

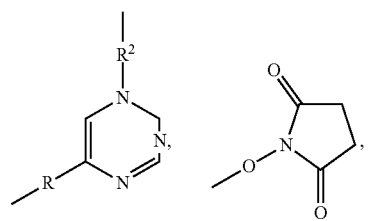

—R₃—(C(=O)₂—NH—NH₂, and —R₄—(S(=O)₂—NH—NH₂. Each of R₁, R₂, R₃, and R₄ is C1-6 divalent aliphatic hydrocarbon, C1-6 alkylene or divalent aromatic hydrocarbon, or a derivative thereof.

In the Structural Formula 1, n is 0 or 1. When n is 0, -L is -L2 in -Ph-CH₂—CH₂—C(=O)-L. When n is 1, -L is -L1-L2 in -Ph-CH₂—CH₂—C(=O)-L.

In the Structural Formula 1, m is an integer of 0 to 4. When m is 0, L1 is —NH—CH₂—CH₂—C(=O)—. When m is 1, L1 is —NH—CH₂—CH₂—O—CH₂—CH₂—C(=O)—. When m is 2, L1 is —NH—CH₂—(CH₂—O—CH₂)—(CH₂—O—CH₂)—CH₂—C(=O)—. When m is 3, L1 is —NH—CH₂—(CH₂—O—CH₂)—(CH₂—O—CH₂)—(CH₂—O—CH₂)—CH₂—C(=O)—. When m is 4, L1 is —NH—CH₂—(CH₂—O—CH₂)—(CH₂—O—CH₂)—(CH₂—O—CH₂)—(CH₂—O—CH₂)—CH₂—C(=O)—.

As the value of m increases, solubility of the amphoteric fluorescent substance according to the present disclosure in the buffer aqueous solution increases, so that labeling can be effectively performed, and a distance between the biomaterial such as a protein and the amphoteric fluorescent substance according to the present disclosure can be increased, such that an effect of the amphoteric fluorescent substance according to the present disclosure on the biomaterial such as the protein can be minimized.

For example, the compound represented by the above Structural Formula 1 may be at least one of compounds represented by a following Structural Formula 2:

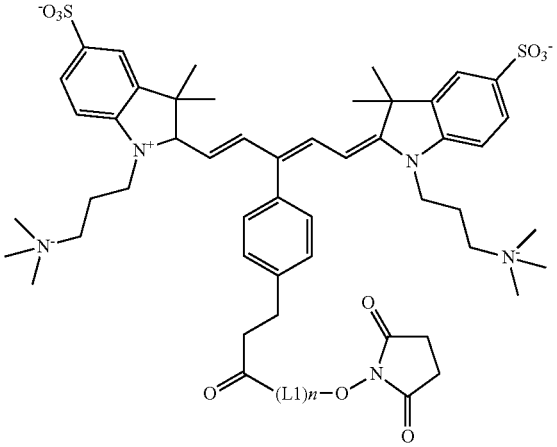

<Structural Formula 2>

In the Structural Formula 2, each of L1 and n is the same as defined in the Structural Formula 1.

For example, one of the compounds represented by the above Structural Formula 2 may be a compound represented by a following Structural Formula 3 or a compound represented by a following Structural Formula 4:

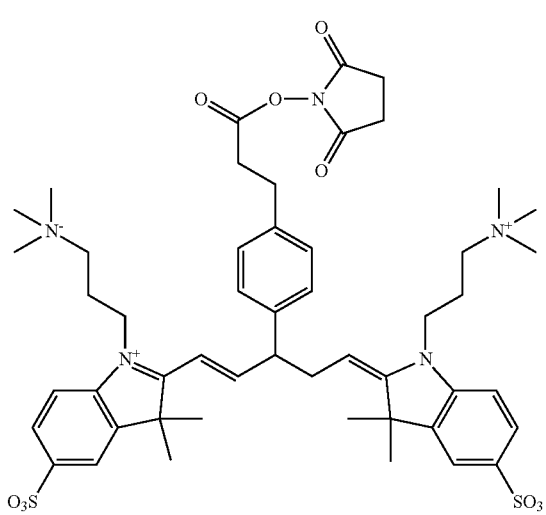

<Structural Formula 3>

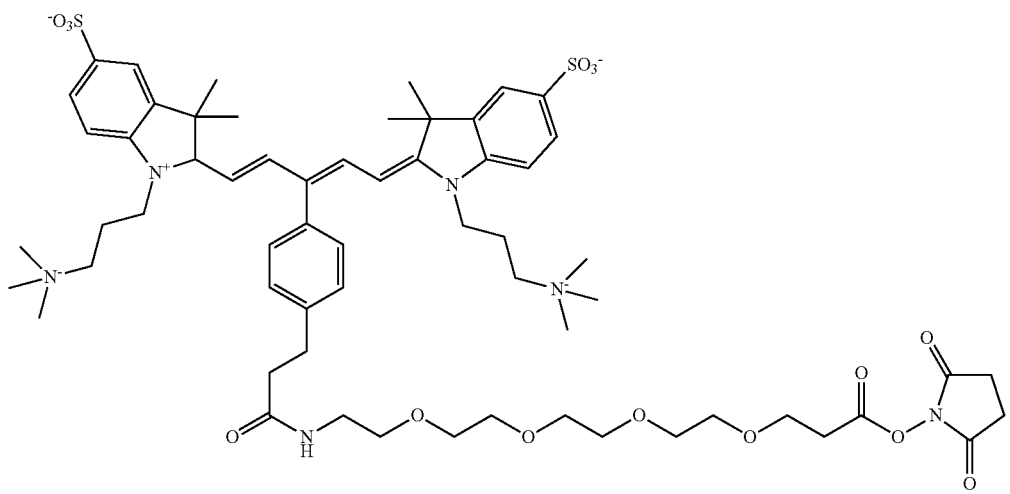
<Structural Formula 4>
Synthesis Example
The compound represented by the above Structural Formula 4 was synthesized according to a following synthesis scheme.
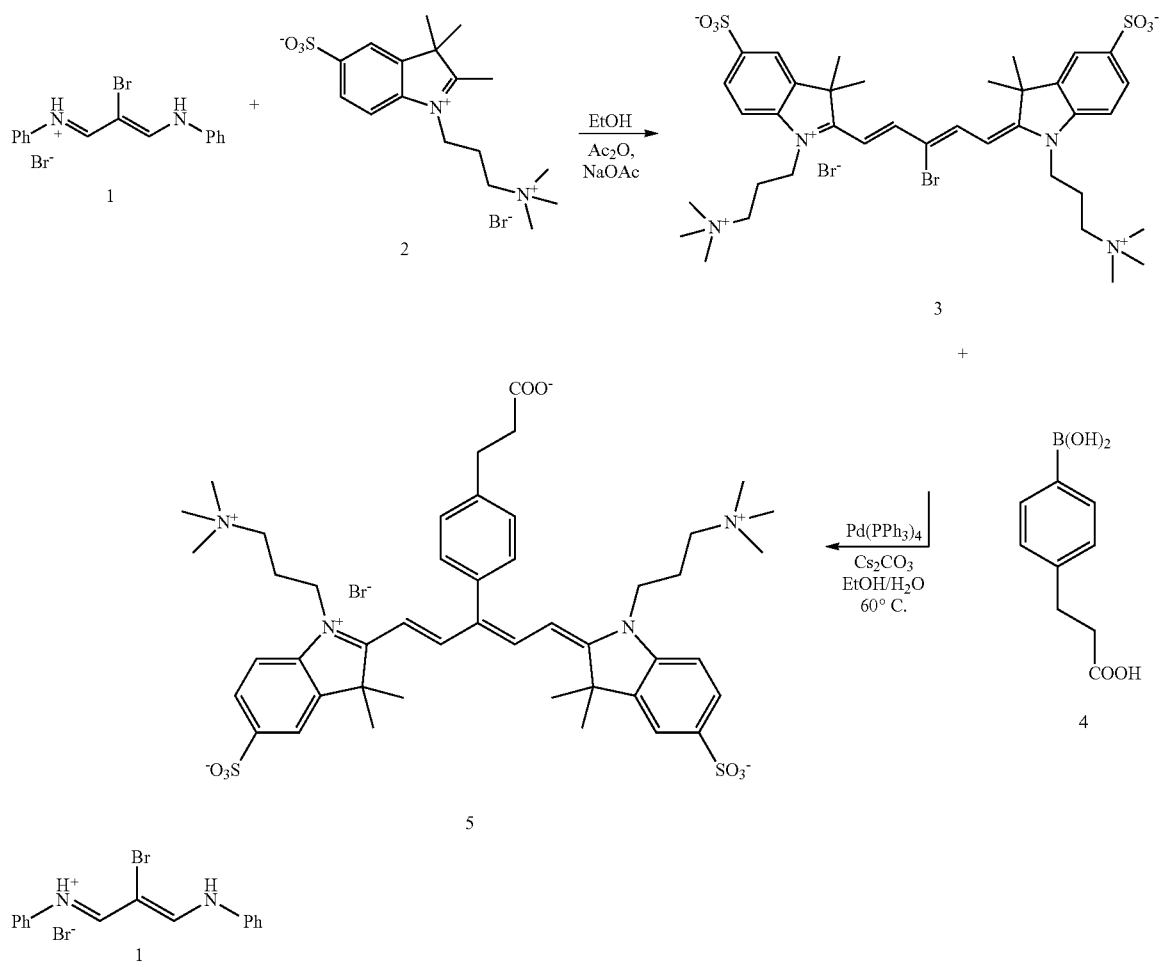

(E)-N—((Z)-2-Bromo-3-(phenylamino)allylidene)benzenaminium bromide (1).

Mucobromic acid (5.940 g, 23.04 mmol) was dissolved in ethanol (40 mL) to produce a mixed solution. Then, aniline (4.286 g, 4.2 mL, 46.1 mmol) diluted with ethanol (20 mL) was added thereto in a dropwise manner for a time duration larger than 10 min.

The mixed solution in a reactor was stirred vigorously and heated slowly to 40° C. After the dropwise addition of aniline was completed, carbon dioxide ($CO_2$) was additionally produced, indicating that the reaction was not complete. After release of carbon dioxide was complete, a golden-brown reaction mixture was cooled in an ice bath. Diethyl ether (50 mL) was added to a resulting product while stirring the same at low temperature until a light yellow solid precipitated. The resulting solid was filtered, washed with ether, dried and used in a subsequent reaction without purification thereof.

Yield 75%; melting point (mp) 189° C. to 191° C.; 1H NMR (400 MHz, DMSO-d6): δ 7.330 (t, J=7.2 Hz, 2H), 7.496 (t, J=8 Hz, 4H), 7.708 (d, J=8 Hz, 4H), 9.559 (s, 2H), 11.513 (s, 2H); 13C NMR (100 MHz, DMSO-d6): d 89.3, 119.5, 123.9, 126.0, 129.2, 129.6, 138.5, 157.4.

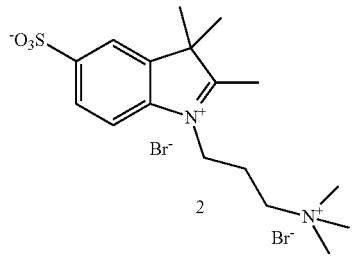

2,3,3-Trimethyl-1-[3-(trimethylammonio)propyl]-3H-indolium-5-sulfonate dibromide (2).

A mixed solution in which a mixture of 2,3,3-trimethyl-3H-indole-5-sulfonic acid (7.17 g, 36.4 mmol) and (3-bromopropyl)trimethyl ammonium bromide (10.5 g, 40 mmol) was dissolved in toluene (60 mL) was heated at 130° C. for 72 hours under a nitrogen atmosphere. The mixed solution was cooled to room temperature and the solvent was decanted off therefrom. A crude product was crystallized using methanol and MTBE to obtain pink crystals, which were used in a next step without further purification thereof.

Yield 81%; melting point (mp) 232° C. to 235° C.; 1H NMR (400 MHz, DMSO-d6): δ 1.56 (s, 6H), 2.51 (s, 3H), 3.07 (m, 2H), 3.12 (s, 9H), 3.62 (t, J=7.2 Hz, 2H), 4.50 (t, J=7.2 Hz, 2H), 7.71 (d, J=8.0 Hz, 1H), 7.79 (d, J=8.0 Hz, 1H), 8.01 (s, 1H). 13C NMR (100 MHz, DMSO-d6): δ 15.0, 21.6, 22.3, 45.2, 53.1, 55.0, 62.4, 115.4, 121.2, 126.8, 141.3, 142.0, 149.9, 199.1. HRMS (ESI) m/z calculation value for $C_{17}H_{27}N_2O_3S$ [M]+339.1740, HRMS (ESI) m/z measurement value for $C_{17}H_{27}N_2O_3S$ [M]+339.1742.

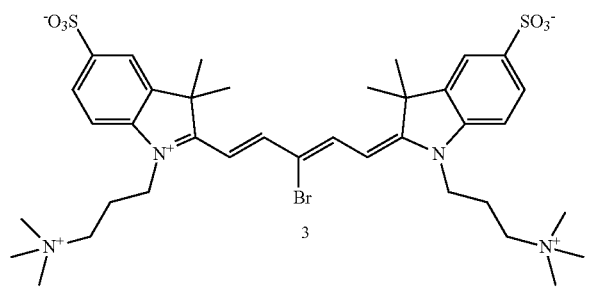

2-((1E,3Z)-3-bromo-5-((E)-3,3-dimethyl-5-sulfonato-1-(3-(trimethylammonio)propyl)indolin-2-ylidene)penta-1,3-dien-1-yl)-3,3-dimethyl-1-(3-(trimethylammonio)propyl)-3H-indol-1-ium-5-sulfonate bromide (3).

At 70° C. under presence of acetic anhydride (8 mL) and sodium acetate (4 mol eq), substituted 2,3,3-trimethyl indolenine salts having N-heterocyclic quaternary ammonium moiety 2 (2 mol eq) reacted with methine bromide reagent 1 (1 mol eq).

The reaction was monitored using UV-Vis-NIR absorption spectroscopy and LC-MS in methanol. After 2 to 4 hours, the reaction was complete. The solvent was removed therefrom under vacuum. A crude material was purified using Fluka silica gel 90 Å C18 reversed phase chromatography using a gradient solvent composition of methanol and water to obtain a final compound of high purity.

Yield 77%; melting point (mp) 252° C. to 254° C.; 1HNMR (400 MHz, DMSO-d6): δ 2.05 (s, 12H), 2.71 (t, J=7.6 Hz, 4H), 3.47 (s, 18H), 3.86 (tt, J=7.6 Hz, 7.2 Hz, 4H), 4.64 (t, J=7.2 Hz, 4H), 6.78 (d, J=13.2 Hz, 2H), 7.73 (d, J=8.0 Hz, 2H), 8.21 (d, J=8 Hz, 2H), 8.25 (s, 2H), 8.56 (d, J=13.2 Hz, 2H); 13CNMR (100 MHz, DMSO-d6), δ: 20.3, 26.3, 40.6, 49.7, 52.3, 63.6, 103.0, 110.2, 116.4, 119.1, 126.6, 140.3, 141.3, 142.5, 150.6, 176.7. Theoretical composition: ($x3H_2O$): C (47.95%), H (6.31%), N (6.05%); Actual composition: C (47.46%), H (6.48%), N (6.05%); HRMS (ESI) m/z calculation value for $[C_{37}H_{52}BrN_4O_6S_2]$+ 792.8822, HRMS (ESI) m/z measurement value for $[C_{37}H_{52}BrN_4O_6S_2]$+792.8854.

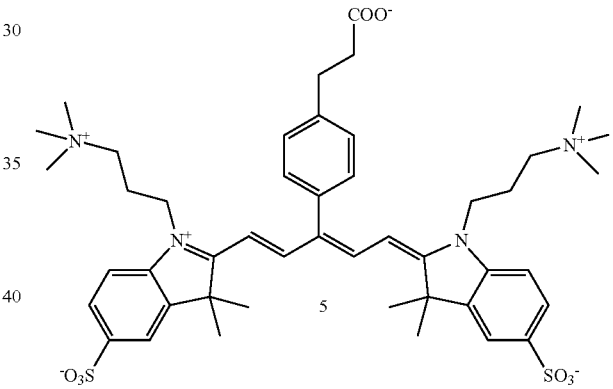

3-(4-((1E,3Z,5E)-1-(3,3-dimethyl-5-sulfonato-1-(3-(trimethylammonio)propyl)-3H-indol-1-ium-2-yl)-5-(3,3-dimethyl-5-sulfonato-1-(3-(trimethylammonio)propyl)indolin-2-ylidene)penta-1,3-dien-3-yl)phenyl)propanoate (5).

A mixed solution in which bromo dye precursor 3 (1.0 mmol) and 3-(4-boronophenyl)propanoic acid 4 (1.8 mmol) were dissolved in water was heated under reflux in presence of $Pd(PPh_3)_4$ (0.065 mmol) for 72 hours.

A reaction progress was monitored using visible/near-infrared spectroscopy based on an aliquot diluted with methanol until absorption of bromorocyanine disappeared.

A reaction mixture was then cooled to room temperature and $H_2O$ was removed therefrom under reduced pressure. A solid was isolated via precipitation with MeOH/acetone, and the precipitate was further washed with acetone.

Open-reversed phase column chromatography (eluting with acetonitrile/water) was used to obtain a final fluorescent substance.

Yield 72%; melting point (mp) >260° C.; λmax=645 nm in $H_2O$; 1H NMR (DMSO-d6), δ: 1.78 (s, 12H), 1.99 (br s, 4H), 2.65 (br s, 2H), 2.93 (br s, 2H), 3.08 (s, 18H), 3.25 (br s, 4H), 3.84 (br s, 4H), 5.65 (d, J=7.0 Hz, 2H), 7.27 (d, J=3.8 Hz, 2H), 7.35 (d, J=4.2 Hz, 2H), 7.42 (d, J=4.0 Hz, 2H), 7.60

(d, J=4.2 Hz, 2H), 7.87 (s, 1H), 8.54 (d, J=7.0 Hz, 2H), 12.33 (s, 1H); 13C NMR (100 MHz, D20, 70° C.), δ: 21.16, 27.51, 32.25, 39.42, 41.30, 49.82, 53.84, 63.95, 102.87, 111.37, 120.49, 127.51, 129.92, 130.67, 133.25, 137.19, 141.23, 142.04, 143.57, 155.23, 175.21, 181.88; HRMS (TOF MS ES+) m/z calculation value for $C_{46}H_{60}N_4O_8S_2$ 860.3853 [M]+, HRMS (TOF MS ES+) m/z measurement value for $C_{46}H_{60}N_4O_8S_2$ 862.4038 [M+2H]+.

—NH—CH$_2$—(CH$_2$—O—CH$_2$)$_4$—CH$_2$—C(=O)—NHS was introduced into the compound 5. Thus, the compound represented by the above Structural Formula 4 was obtained.

<NHS>

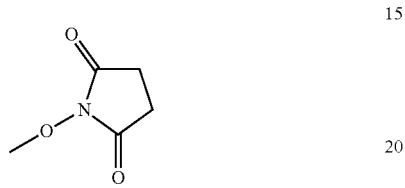

<Structural Formula 4>

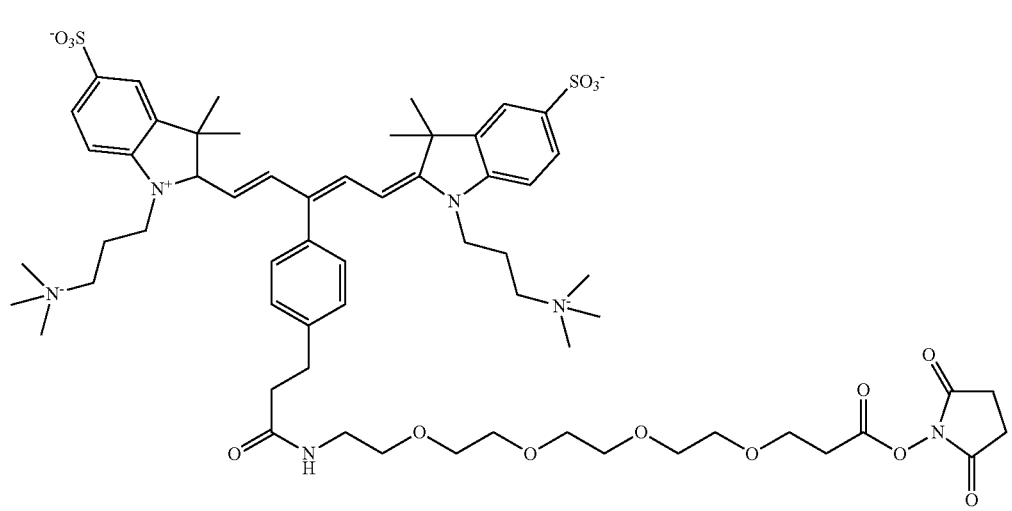

FIG. 1 shows a result of UPLC (Ultra-Performance Liquid Chromatography) analysis of the compound represented by the above Structural Formula 4.

UPLC Analysis
 UPLC: WATERS.
 Column: HSS C18 SB 1.8 mm 2.1×50 mm.
 Gradient: performed with 5 to 50% methanol for a time duration larger than 3 minutes.

Although the embodiments of the present disclosure have been described above, the present disclosure is not limited to the above embodiments, but may be implemented in a variety of different forms. Those of ordinary skill in the art to which the present disclosure belongs will appreciate that the disclosure may be practiced in other specific forms without changing the technical spirit or essential features of the disclosure. Therefore, it should be understood that the embodiments as described above are not restrictive but illustrative in all respects.

INDUSTRIAL APPLICABILITY

The present disclosure provides an amphoteric fluorescent substance that is capable of binding to a biomaterial.

The amphoteric fluorescent substance includes at least one of compounds represented by a following Structural Formula 1:

13

<Structural Formula 1>

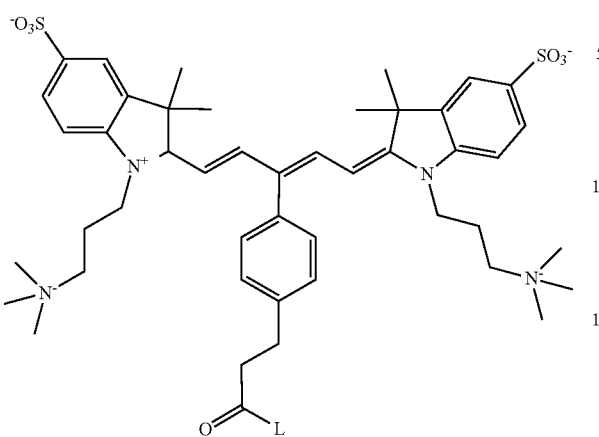

In the above Structural Formula 1, L is the same as defined above.

What is claimed is:

1. An amphoteric fluorescent substance comprising at least one compound represented by Structural Formula 1:

<Structural Formula 1>

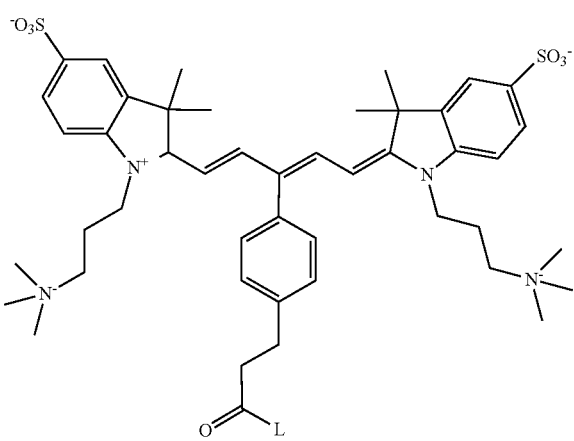

wherein in the Structural Formula 1,

L is -(L1)$_n$-(L2),

L1 is -NH—CH$_2$—(CH$_2$—O—CH$_2$)$_m$—CH$_2$—C(=O)—,

L2 is one of azide, acetylene, maleimide, biotin, hydrizide,

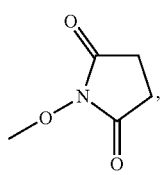

14

—R$_3$—(C(=O))$_2$—NH—NH$_2$, and —R$_4$—(S(=O))$_2$—NH—NH$_2$, each of R$_3$ and R$_4$ is C1-6 divalent aliphatic hydrocarbon, C1-6 alkylene or divalent aromatic hydrocarbon, n is 0 or 1, and m is an integer of 0 to 4.

2. The amphoteric fluorescent substance of claim 1, wherein the compound is represented by Structural Formula 2:

<Structural Formula 2>

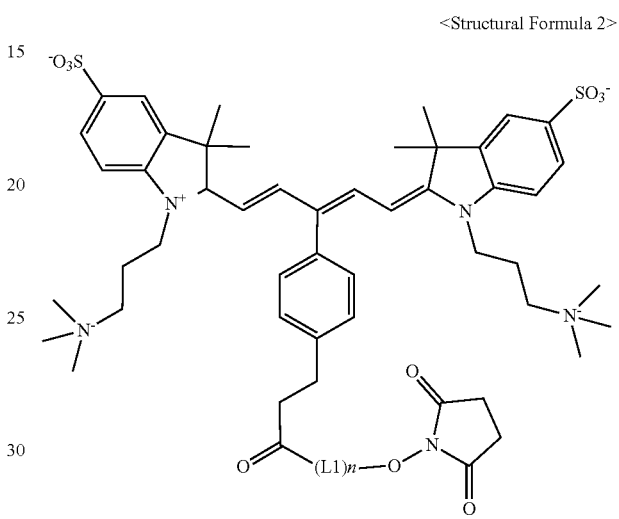

wherein in the Structural Formula 2, each of L1 and n is the same as defined in the Structural Formula 1.

3. The amphoteric fluorescent substance of claim 2, wherein the compound is represented by Structural Formula 3:

<Structural Formula 3>

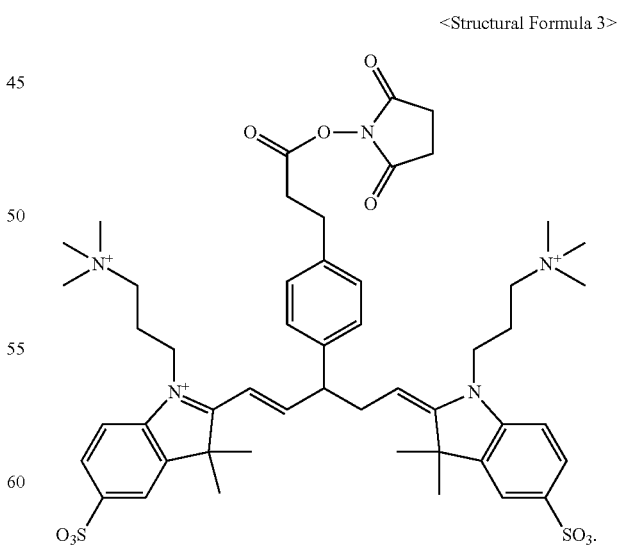

4. The amphoteric fluorescent substance of claim 2, wherein the compound is represented by Structural Formula 4:

<Structural Formula 4>
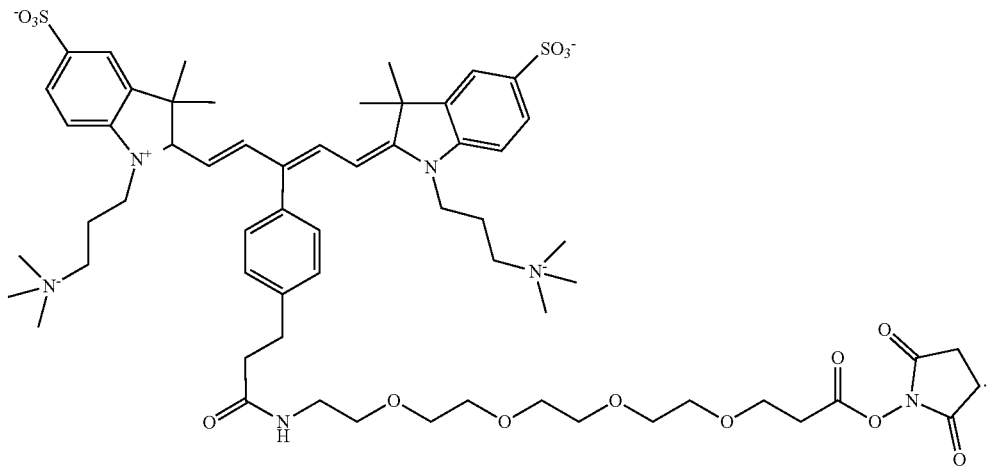
* * * * *